United States Patent
Vyacheslav

(10) Patent No.: US 10,429,171 B2
(45) Date of Patent: Oct. 1, 2019

(54) LASER MULTIBEAM DIFFERENTIAL INTERFEROMETRIC SENSOR AND METHODS FOR VIBRATION IMAGING

(71) Applicant: THE UNIVERSITY OF MISSISSIPPI, University, MS (US)

(72) Inventor: Aranchuk Vyacheslav, University, MS (US)

(73) Assignee: THE UNIVERSITY OF MISSISSIPPI, University, MS (US)

(*) Notice: Subject to any disclaimer, the term of this patent is extended or adjusted under 35 U.S.C. 154(b) by 0 days.

(21) Appl. No.: 15/745,771

(22) PCT Filed: Jul. 21, 2016

(86) PCT No.: PCT/US2016/043251
§ 371 (c)(1),
(2) Date: Jan. 18, 2018

(87) PCT Pub. No.: WO2017/015424
PCT Pub. Date: Jan. 26, 2017

(65) Prior Publication Data
US 2018/0216927 A1    Aug. 2, 2018

Related U.S. Application Data

(60) Provisional application No. 62/195,368, filed on Jul. 22, 2015.

(51) Int. Cl.
*G01B 9/02* (2006.01)
*G01H 9/00* (2006.01)
(Continued)

(52) U.S. Cl.
CPC ..... *G01B 9/02083* (2013.01); *G01B 9/02003* (2013.01); *G01B 9/02019* (2013.01);
(Continued)

(58) Field of Classification Search
CPC ........................................................ G01H 9/00
See application file for complete search history.

(56) References Cited

U.S. PATENT DOCUMENTS 3,139,618 A * 6/1964 Goldfischer ............ G01S 13/60
327/518
4,924,477 A   5/1990 Gilmore et al.
(Continued)

OTHER PUBLICATIONS

International Search Report issued in PCT/US2016/043251 dated Oct. 24, 2016.
(Continued)

*Primary Examiner* — Shawn Decenzo
(74) *Attorney, Agent, or Firm* — Armstrong Teasdale LLP

(57) ABSTRACT

A sensor for a vibration imaging system is provided. The sensor includes a transmitter configured to project an array of laser beams onto a surface of an object such that neighboring beams in the array of laser beams are frequency shifted relative to each other, an interferometer configured to mix radiations reflected from neighboring points on the surface of the object such that the radiations from neighboring points interfere with one another, a photodetector array configured to produce output signals representative of the interfering beams, a demodulator configured to demodulate the output signals, and a computing device configured to calculate a deformation profile for the object based on the demodulated output signals.

22 Claims, 14 Drawing Sheets

(51) Int. Cl.
*G01B 11/16* (2006.01)
*G01M 7/02* (2006.01)

(52) U.S. Cl.
CPC ..... *G01B 9/02027* (2013.01); *G01B 9/02028* (2013.01); *G01B 9/02045* (2013.01); *G01B 9/02077* (2013.01); *G01B 11/161* (2013.01); *G01H 9/004* (2013.01); *G01M 7/025* (2013.01); *G01B 2290/65* (2013.01); *G01B 2290/70* (2013.01)

(56) References Cited

U.S. PATENT DOCUMENTS

| | | | | |
|---|---|---|---|---|
| 4,978,219 | A | | 12/1990 | Bessho |
| 5,081,994 | A | * | 1/1992 | Hassler ............... G01P 5/244 600/455 |
| 5,523,839 | A | | 6/1996 | Robinson et al. |
| 5,923,281 | A | * | 7/1999 | Vopat ................. G01S 13/60 342/117 |
| 6,093,149 | A | * | 7/2000 | Guracar ............... A61B 8/08 600/447 |
| 7,190,635 | B1 | * | 3/2007 | Killinger ............. G01S 5/20 367/128 |
| 8,797,549 | B2 | * | 8/2014 | Meldahl ............. G01B 11/2441 356/511 |
| 8,797,828 | B1 | * | 8/2014 | Lev .................... G01V 8/00 356/486 |
| 9,212,896 | B2 | * | 12/2015 | Wortge ............ G01B 9/02023 |
| 2007/0091316 | A1 | * | 4/2007 | Lal .................... G01H 9/002 356/486 |
| 2007/0177154 | A1 | | 8/2007 | Rembe |
| 2008/0074674 | A1 | * | 3/2008 | Chen .................. G01B 15/00 356/502 |
| 2008/0144041 | A1 | * | 6/2008 | Muenter ............... G01H 9/00 356/484 |
| 2009/0030321 | A1 | * | 1/2009 | Baba .................. A61B 8/06 600/454 |
| 2009/0046296 | A1 | * | 2/2009 | Kilpatrick ............ G01H 9/004 356/484 |
| 2009/0076752 | A1 | | 3/2009 | Wang et al. |
| 2009/0147267 | A1 | | 6/2009 | Lawall |
| 2010/0281986 | A1 | * | 11/2010 | Toal .................... G01H 9/00 73/656 |
| 2012/0240682 | A1 | | 9/2012 | Boon et al. |
| 2014/0009750 | A1 | * | 1/2014 | Schussler ............. G01H 9/00 356/28.5 |
| 2014/0292363 | A1 | * | 10/2014 | Ng ..................... G01R 31/311 324/754.23 |
| 2015/0289846 | A1 | * | 10/2015 | Park ................... A61B 8/5207 600/447 |
| 2016/0252616 | A1 | * | 9/2016 | Wilby ................. G01S 15/89 367/7 |
| 2019/0041258 | A1 | * | 2/2019 | Bahadirlar ........... G01H 9/004 |

OTHER PUBLICATIONS

Extended European Search Report for International Application No. PCT/US2016043251, dated Dec. 11, 2018, 8 pages.

* cited by examiner

LASER MULTIBEAM DIFFERENTIAL INTERFEROMETRIC SENSOR AND METHODS FOR VIBRATION IMAGING

CROSS REFERENCE TO RELATED APPLICATIONS

This application is a National Stage Entry of PCT/US2016/043251, filed Jul. 21, 2016, which claims priority to U.S. Provisional Patent Application No. 62/195,368, filed Jul. 22, 2015, both of which are hereby incorporated by reference in their entirety

STATEMENT REGARDING FEDERALLY SPONSORED RESEARCH AND DEVELOPMENT

This invention was made with Government support under contract numbers AWARD N00014-13-1-0868 and AWARD N0014-15-1-2660 awarded by the Office of Naval Research. The Government has certain rights in this invention.

FIELD OF THE DISCLOSURE

The present disclosure relates generally to non-contact measurement of vibration using multiple beams of coherent radiation to simultaneously sense vibration in multiple points on an object and to produce a vibration image of the object.

BACKGROUND

In laser vibrometry, by measuring vibration of an object at multiple points on a surface of the object, a vibration image of the object can be obtained. Applications for vibration imaging include acoustic detection of buried mines, non-destructive testing, structural health monitoring, modal analysis, etc.

In at least some known vibration imaging systems, a multiple beam laser Doppler vibrometer (MB LDV) is used to obtain a vibration image of an object. For a MB LDV, a laser beam is split into two identical arrays of beams: an array of object beams and an array of reference beams. The object beams are incident onto an object to form a grid of points on the object surface. Light scattered back from each point is mixed with a corresponding reference beam on an array of photodetectors, thus producing a plurality of interference signals. Each interference signal carries information about the object vibration in the corresponding points on the object surface. Simultaneous processing of the interferences signals facilitates generating a vibration image of the object.

Although MB LDV can provide remote vibration measurements with a high sensitivity and accuracy, MB LDV systems typically require operation on a stable platform. Specifically, platform motion can cause variation of the interference signals which is indistinguishable from signals caused by object vibration. In additional, motion of the platform or measured object along a direction of the laser beam (e.g., when the MB LDV operates onboard a moving vehicle) can disrupt the vibration measurements if the relative speed between the MB LDV and the object exceeds a maximum velocity measured by the MB LDV. The measurements in an MB LDV system may also be affected by air turbulence, which changes a phase of the object-reflected light. As a result, MB LDV applications are generally restricted to stationary platforms and short measurement distances. Accordingly, there is a desire for a vibration imaging sensor that has a relatively low sensitivity to platform motion and air turbulence.

SUMMARY

In one embodiment, a sensor for a vibration imaging system is provided. The sensor includes a transmitter configured to project an array of laser beams onto a surface of an object such that neighboring beams in the array of laser beams are frequency shifted relative to each other, an interferometer configured to mix radiations reflected from neighboring points on the surface of the object such that the radiations from neighboring points interfere with one another, a photodetector array configured to produce output signals representative of the interfering beams, a demodulator configured to demodulate the output signals, and a computing device configured to calculate a deformation profile for the object based on the demodulated output signals.

In another embodiment, a vibration imaging system for performing non-destructive testing on an object is provided. The system includes an object having a surface, and a sensor configured to generate a deformation profile for the object, the sensor including a transmitter configured to project an array of laser beams onto the surface such that neighboring beams in the array of laser beams are frequency shifted relative to each other, an interferometer configured to mix radiations reflected from neighboring points on the object surface together such that the radiations from neighboring points interfere with one another, a photodetector array configured to produce output signals representative of the interfering beams, a demodulator configured to demodulate the output signals; and a computing device configured to calculate the deformation profile based on the demodulated output signals.

In yet another embodiment, a method for generating a deformation profile for an object for non-destructive testing purposes is provided. The method includes projecting an array of laser beams onto a surface of the object such that neighboring beams in the array of laser beams are frequency shifted relative to each other, mixing, using an interferometer, radiations reflected from neighboring points on the object surface together such that the radiations from neighboring points interfere with one another, producing, using a photodetector array, output signals representative of the interfering beams, demodulating the output signals, and calculating the deformation profile based on the demodulated output signals.

BRIEF DESCRIPTION OF THE DRAWINGS

Corresponding reference characters indicate corresponding parts throughout the drawings.

DETAILED DESCRIPTION OF THE DRAWINGS

The systems and methods described herein provide a laser multibeam differential interferometric sensor (LaMBDIS) for vibration imaging. Using the LaMBDIS sensor, an object is illuminated with an array of laser beams, in which every other beam is frequency shifted by a predetermined amount relative to the other beams. The light reflected from each pair of neighboring laser spots on the object surface, which have a different frequency, is mixed together and interferes on an array of photodetectors, producing heterodyne signals on the photodetector outputs.

Demodulation of heterodyne signals on the photodetector outputs reveals relative velocities and displacements between neighboring illuminated points on the object surface, thus providing a dynamic deformation gradient of the surface along the line of the beams. Scanning the array of beams in the transverse direction provides a two-dimensional (2D) deformation gradient of the object across the scanned area. Integration of the obtained deformation gradient may reveal the deformation of the object. The frequency of light reflected from each point on the object varies in conjunction with the vibration velocity at this point due to the Doppler effect. Interference of the light from two neighboring spots produces a heterodyne signal, for which deviation from a carrier frequency is proportional to the difference in vibration velocity between the neighboring points. As a result, the LaMBDIS sensor is sensitive to the relative vibration velocities between neighboring illuminated points on the object surface, and has low sensitivity to both the motion of the sensor itself and the whole body motion of the object because all beams will experience the same Doppler shift due to this motion, which will automatically be subtracted from the measurement results. The LaMBDIS sensor also has low sensitivity to air turbulence because all the interfering beams propagate along optical paths that are close to each other.

Figure 1:
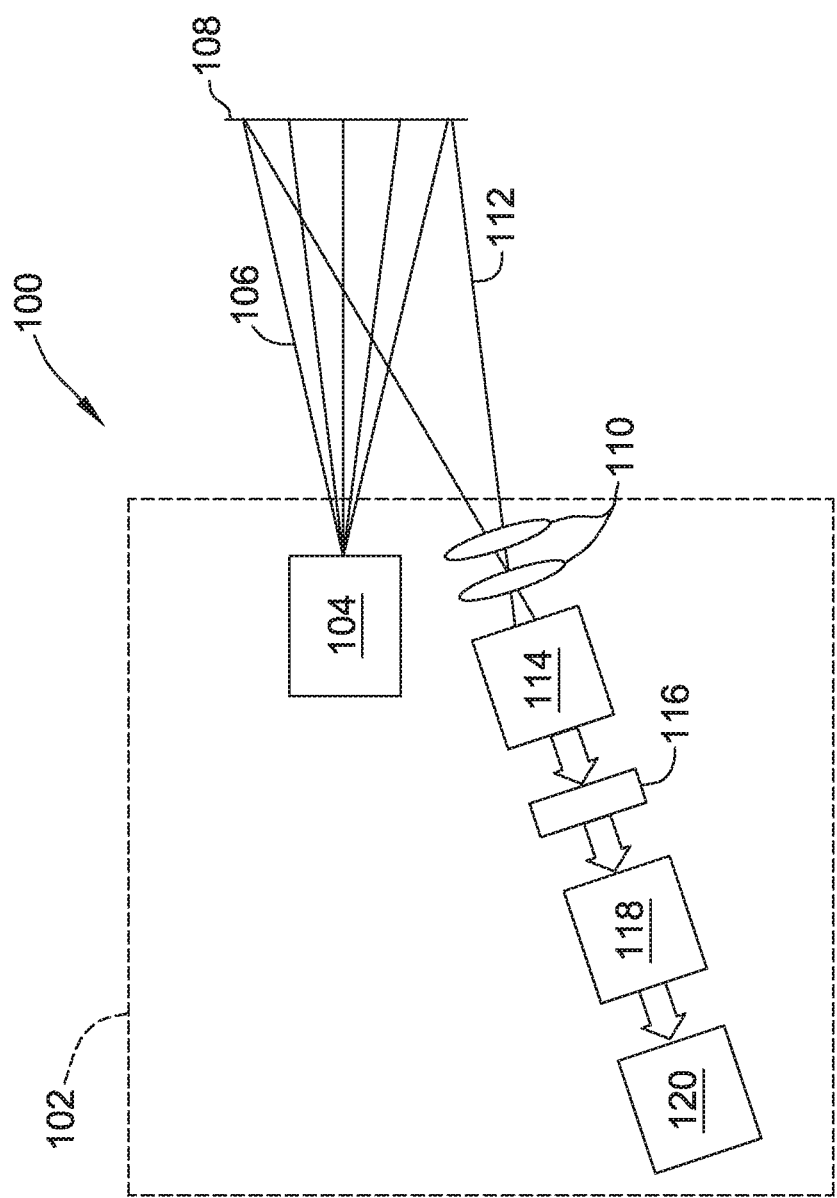
FIG. 1 is a block diagram of one embodiment of a laser multibeam differential interferometric sensor (LaMBDIS) for vibration imaging.

Referring now to the drawings and in particular to FIG. 1, one embodiment of a vibration imaging system is generally indicated at 100. System 100 includes a LaMBDIS sensor 102 including a transmitting sub-system 104 that generates an array (e.g., a linear array or a matrix array) of laser beams 106. Laser beams 106 are directed towards a surface 108 of an object. The array of laser beams 106 is generated by transmitting sub-system 104 such that each beam 106 in the array is frequency shifted relative to its neighboring beams.

Receiving optics 110 collects reflected laser beams 112 that are reflected off of surface 108, and direct the collected beams into a shearing device, such as an interferometer 114. Alternatively, other shearing devices (e.g., an optical prism/wedge) may be used instead of interferometer 114. In interferometer 114, light from each pair of neighboring laser spots on surface 108, which have different frequency shifts from one another, are mixed together and interfere on a photodetector array 116, producing signals on outputs of photodetectors in array 116. A carrier frequency of the output signals is equal to the difference in frequency shifts between beams. Accordingly, a demodulation sub-system 118 demodulates signals from the output of photodetector array 116, producing relative velocity and displacement signals between neighboring laser spots on the object. Demodulation sub-system 118 may include digital and/or analog demodulation circuits. The demodulated signals are provided to a data output sub-system 120 that may, for example, generate a vibration velocity or displacement image or profile from the demodulated signals and display the vibration velocity or displacement image or profile to a user.

Figure 2:
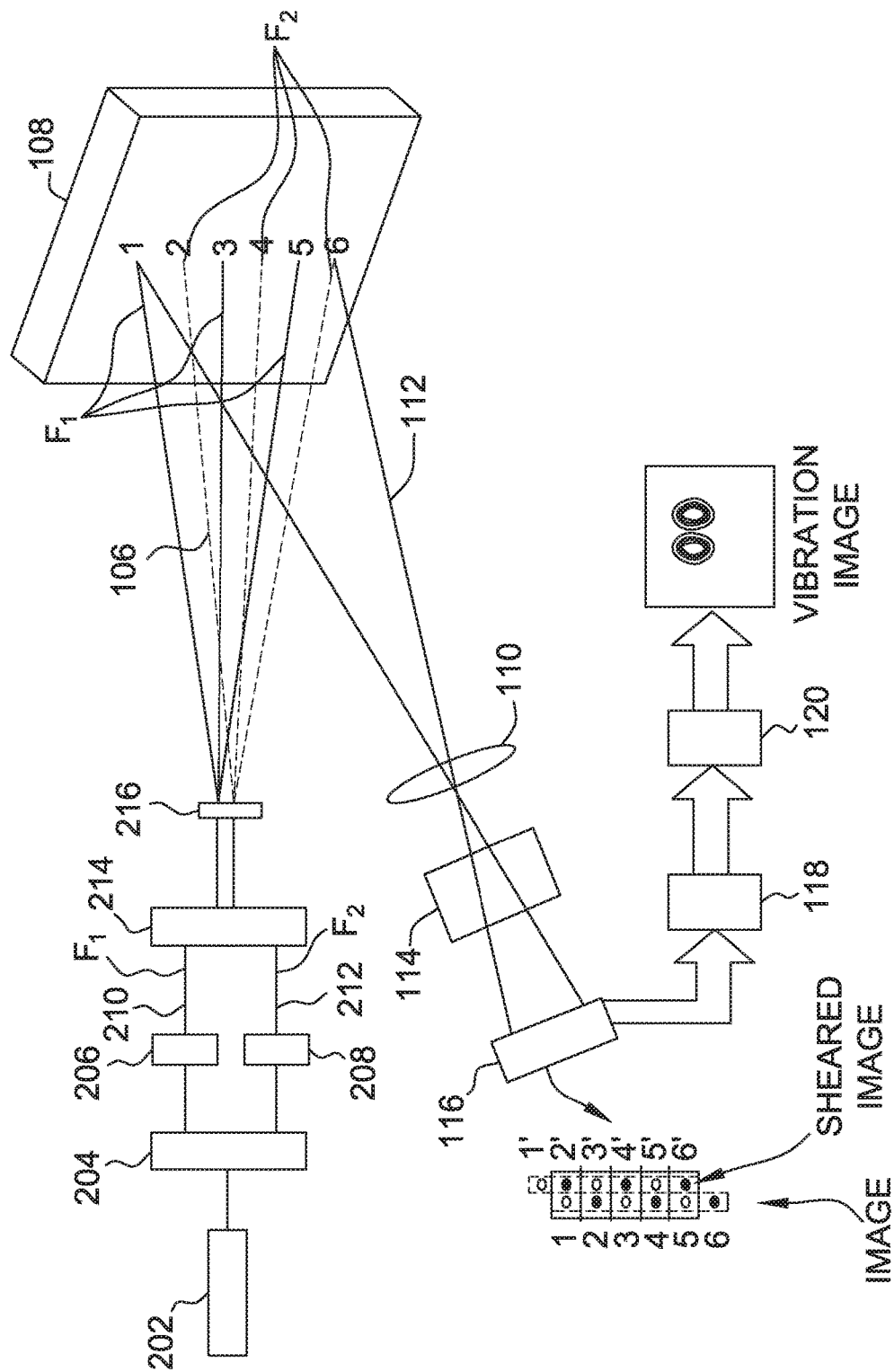
FIG. 2 is an optical schematic diagram illustrating operation of the LaMBDIS shown in FIG. 1.

FIG. 2 is a schematic diagram that illustrates operation of LaMBDIS 102. A beam from a laser 202 is divided into two beams by a beam splitter 204. The frequency of each beam is then shifted by a different amount $F_1$ and $F_2$ respectively using frequency shifters 206 and 208. Acousto-optical modulators/frequency shifters, or other types of frequency shifters may be used. Frequency shifted beams 210 and 212 are then combined together by a beam combiner 214. A diffractive optical element (DOE) 216 splits frequency shifted beams 210 and 212 into two identical arrays of beams. The angle between the two frequency shifted beams 210 and 212 on the output of beam combiner 214 is adjusted such that the two arrays of beams are sheared on object surface 108 relative to each other by a half of an inter-beam spacing of the array. Specifically, each beam of frequency $F_1$ is positioned on object surface 108 exactly between two beams of frequency $F_2$. Light 112 reflected from object surface 108 is collected by lens 110 which together with interferometer 114 creates an image of object surface 108 and its sheared copy on photodetector array (PDA) 116, so that an image of each laser spot on object surface 108 is positioned on a separate photosensitive element of PDA 116. Interferometer 114 or any other optical shearing device can be used to produce an image and its sheared copy. The image and its sheared copy are sheared relative each other on PDA 16 by the spacing between neighboring laser spots in the image plane. As a result, the light from each pair of neighboring laser spots on the object surface 108, which have different frequencies (i.e., differing by $F_2-F_1$), are mixed together to interfere on PDA 116, producing heterodyne frequency modulated (FM) signals with carrier frequency $F_H$ on photodetector array outputs. The carrier frequency $F_H$ of the heterodyne signals is equal to the frequency difference $F_2-F_1$ between frequency shifted beams (i.e., $F_H=F_2-F_1$).

Referring to FIG. 2, image 1-6 of laser spots on the object surface is overlapped on photosensitive elements of PDA 116 with its sheared copy 1'-6'. In more detail, image 1 of spot 1 is overlapped with sheared image 2' of spot 2 on element 1, image 2 of spot 2 is overlapped with sheared image 3' of spot 3 on element 2, and so on. The photodetector signals are digitized and demodulated using digital demodulation (e.g., using demodulation sub-system 118). Alternatively, the PDA signals could be frequency demodulated by an analog frequency demodulator, for example a phase-locked loop. The demodulated signals are provided to a data output sub-system 120 that may, for example, generate a vibration velocity or displacement image or profile from the demodulated signals and display the vibration velocity or displacement image or profile to a user.

Demodulation of the PDA signals reveals the relative velocity and displacement of the object surface between neighboring laser spots on object surface 108. For example, demodulation of signal on the channel 1 of PDA 116 gives the relative velocity between the laser spots 1 and 2, demodulation of signal on the channel 2 of PDA 116 gives the relative velocity between the laser spots 2 and 3, and so on. The frequency of light reflected from each point on the object will vary in conjunction with the vibration velocity at this point due to the Doppler effect. Interference of light from two neighboring spots produces an interference signal, with a frequency proportional to the difference in vibration velocity between the neighboring points. As a result, LaMBDIS sensor 102 is sensitive to the relative vibration between neighboring illuminated points on the object surface, and has low sensitivity to the motion of sensor 102 itself and the whole body motion of object surface 108 because all beams experience the same Doppler shift due to this motion, which is automatically subtracted from measurement results.

The following is a description of the mathematics implemented in the systems and methods described herein. Specifically, each point of a vibrating object vibrates with a different velocity (except for the cause of a rigid body motion, which is of little interest). Accordingly, vibration velocities $V_i$ and $V_j$ at points of incidence of neighboring laser beams i and j cause frequency shifts $F_{Di}$ and $F_{Dj}$ of the optical frequency of the returned scattered light from the object due to Doppler effect:

$$F_{Di} = \frac{2V_i}{\lambda}\cos\alpha_i; \; F_{Dj} = \frac{2V_j}{\lambda}\cos\alpha_j$$

where $\lambda$ is optical wavelength, and $\alpha_i$ and $\alpha_j$ are an intersection angle between the direction of light beam i and j respectively and object velocity direction. Interference of light from two neighboring spots i and j on a photodetector produces a heterodyne signal $i_{ij}(t)$ on the photodetector output:

$$i_{ij}(t) = J \cos[2\pi(F_H + \Delta F_{Dij}(t)) + \Delta\varphi]$$

where $$J = 2kP_i^{\frac{1}{2}}P_j^{\frac{1}{2}}$$

is the amplitude of the heterodyne signal, k is the sensitivity of the photodetector, $P_i$ and $P_j$ are the optical powers of the light on the photodetector reflected from the two neighboring spots i and j, $F_H$ is the carrier frequency equal to the frequency shift between adjacent beams on the object, $$\Delta F_{Dij}(t) = F_{Di}(t) - F_{Dj}(t) = \frac{2}{\lambda}(V_i\cos\alpha_i - V_j\cos\alpha_j)$$

is the difference in Doppler shifts of light reflected from spots i and j on the photodetector, and $\Delta\varphi$ is the phase difference of light on the photodetector reflected from the two neighboring spots i and j.

Accordingly, the detected signal is a frequency modulated (FM) signal with carrier frequency $F_H$. Using FM demodulation techniques, a relative vibration velocity $V_i-V_j$ can be extracted, provided that angles $\alpha_i$ and $\alpha_j$ are known from the geometry of the system. For many applications, the angle between neighboring beams will be less than one degree, and it can be assumed that $\cos(\alpha_i)$ is substantially equal to $\cos(\alpha_j)$. Relative velocities and displacements between neighboring illuminated points on the object surface provide a deformation gradient, and integration of the deformation gradient could produce deformation of the object surface.

Figure 3:
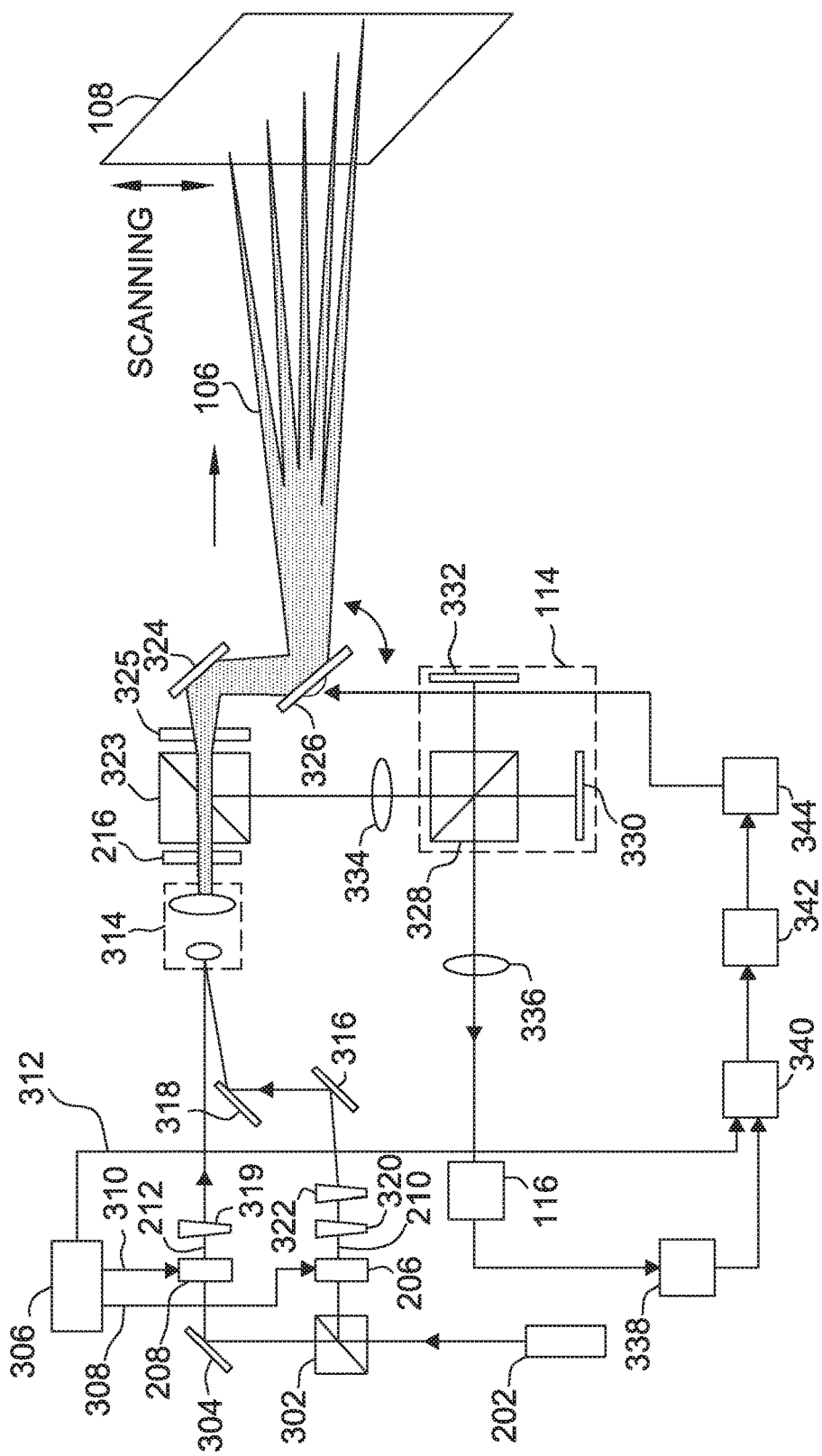
FIG. 3 is an optical schematic diagram of one embodiment of the LaMBDIS shown in FIG. 1.

FIG. 3 is an optical schematic diagram of one embodiment of LaMBDIS sensor 102 (shown in FIG. 1). Sensor 102 includes a laser source 202 that emits a linear polarized beam. A beam splitter 302 splits the laser beam into two equal intensity beams. A mirror 304 direct the beam transmitted by the beam splitter 302 parallel to the beam reflected by the beam splitter 302. The frequencies of both beams are shifted by a different amount using first and second frequency shifters 206 and 208. In this embodiment of the invention acousto-optical modulators (AOM) are used to shift the frequency of the beams. In other embodiments of the invention the frequency shift may be implemented by various devices to shift the frequency of beams. In this embodiment, one beam is shifted by 110.0 megahertz (MHz) and the other beam is shifted by 110.01 MHz. This produces a 10 kilohertz (kHz) relative frequency shift between the two beams. Alternatively, the beams' frequency may be shifted by any amount that enables LaMBDIS sensor 102 to function as described herein.

First and second AOMs 206 and 208 are driven by an AOM driver system 306 that generates 110 MHz and 110.01 MHz signals 308 and 310, and a 10 kHz frequency difference signal 312. Signals 308 and 310 may be phase-locked to the same crystal oscillator in the driver system 306 in order to provide a very stable frequency difference. 110 MHz and 110.01 MHz signals 308 and 310 drive first and second AOMs 206 and 208, respectively, and 10 kHz frequency difference signal 312 is used as a reference carrier for demodulation of the signals. Frequency shifted beams 210 and 212 pass through a beam expander 314, and are incident onto a diffractive optical element (DOE) 216. Mirrors 316 and 318 are used to direct the beam 210 at an angle α to the beam 212. The angle α between the beams 210 and 212 is related to the inter-beam angle Θ (the angle between neighboring beams at the DOE output) of the DOE 216 and the magnification M of the beam expander 314 through the following expression: α=Θ·M/2 Prism 319 positioned after the AOM 208, and prisms 320 and 322 positioned after the AOM 206 are used for accurate angular adjustment of the beams 210 and 212. The beam expander 314 increases the diameter of the beams 210 and 212 by M times and reduces the angle between the beams by M times.

DOE 216 splits each of two frequency shifted beams 210 and 212 into identical arrays of beams sheared relative to each other by a half of the inter-beam angle. The DOE 216 can split a beam into a linear or a matrix (2D) array of beams. The two sheared beam arrays form a combined beam array 106 in which every other beam in the direction of shear is frequency shifted relative to the neighboring beams. Specifically, for a linear array of beams the frequency of the neighboring beams in the combined beam array 106 could be, for example, 110 MHz and 110.01 MHz respectively, so each of the 110.0 MHz beams is positioned on the object exactly between two 110.01 MHz beams. Accordingly, in the linear array, there exists a 10 kHz frequency shift between neighboring beams. All beams in the beam array 106 are focused on the object surface 108 using a beam expander 314. After the DOE 216, a polarizing beam splitter 323 transmits p-polarized light towards the object. A quarter-wave plate 325 converts the p-polarized light into circularly polarized light incident upon object surface 108. The mirror 324 and the scanning mirror 326 direct the beams 106 to object surface 108. The scanning mirror 326 can be used to scan the array of beams 106 across object surface 108 in order to create a vibration image of object surface 108.

The light reflected back by object surface 108 passes through mirrors 326 and 324, and the quarter-wave plate 325, changing the polarization from circular to s-polarized light. The s-polarized light is reflected by polarizing beam splitter 323 and enters an interferometer 114.

In this embodiment, interferometer 114 is a Michelson interferometer that includes a non-polarizing beam splitter 328 and first and second mirrors 330 and 332. Lenses 334 and 336 create an image of laser spots on surface 108 on a photodetector array 116. In interferometer 114, the light from each pair of neighboring laser spots on surface 108, which have different frequencies (i.e., differing by 10 kHz), are mixed together to interfere on the photodetector array 116, producing heterodyne signals with 10 kHz carrier on outputs of the photodetector array 116. The photodetector signals are amplified by the amplifier 338, digitized using an A/D converter 340, and demodulated using digital demodulation (e.g., using demodulation sub-system 118 (shown in FIG. 1)) in the computer 342. Alternatively, the amplified PDA signals could be frequency demodulated by an analog frequency demodulator. The computer 342 controls the scanner driver 344 to scan the beam array 106 across object surface 108 in order to produce a vibration image of the object.

Figure 4A:
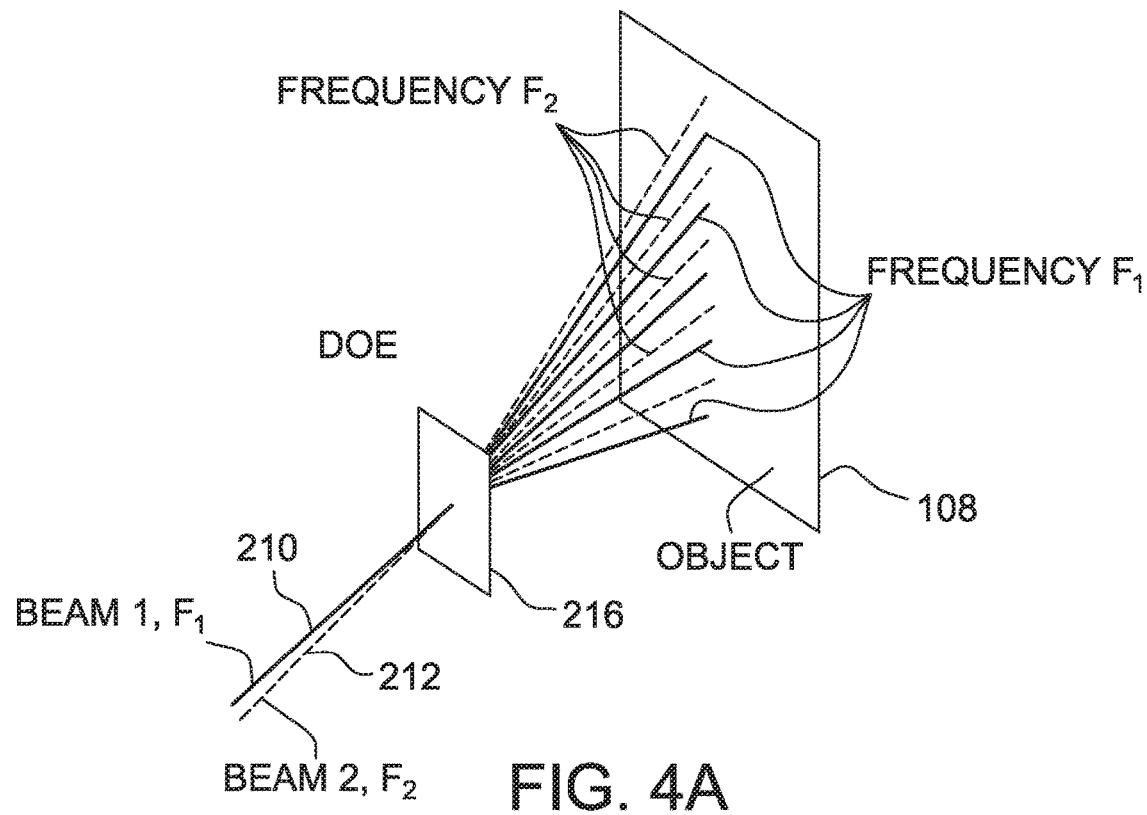
FIGS. 4A and 4B illustrate generation of a linear array of beams.
Figure 4B:
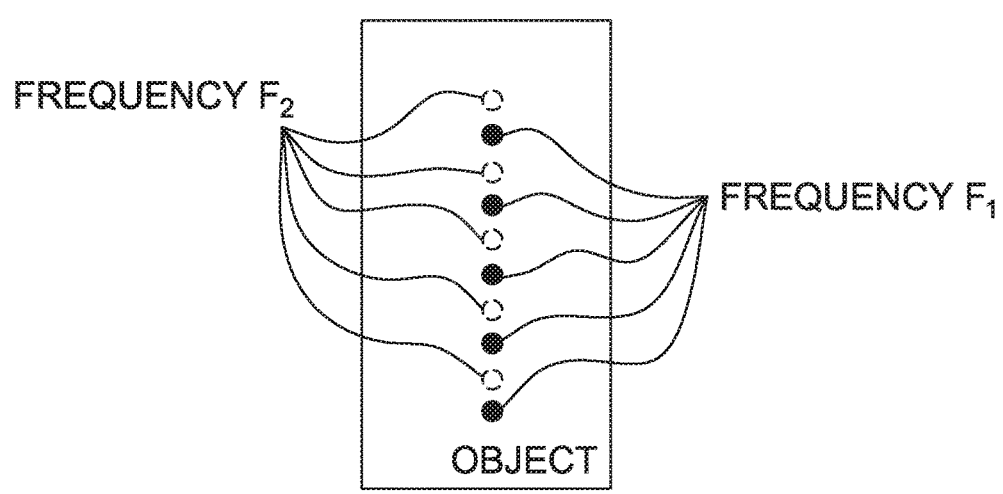

FIGS. 4A and 4B illustrate generation of a linear array of beams, in which each beam in the array is frequency shifted relative to its neighboring beams. Two beams 210 and 212 with frequency shifts $F_1$ and $F_2$ are incident onto DOE 216. The angle between beams 210 and 212 is equal to a half of the inter-beam angle of DOE 216. (The inter-beam angle is the angle between neighboring beams at the output of DOE 216). DOE 216 splits two frequency shifted beams 210 and 212 into two identical arrays of beams sheared relative to each other by a half of the inter-beam angle. Each beam having a frequency shift $F_1$ positioned exactly between two beams that have a frequency shift $F_2$ on object surface 108.

Figure 5:
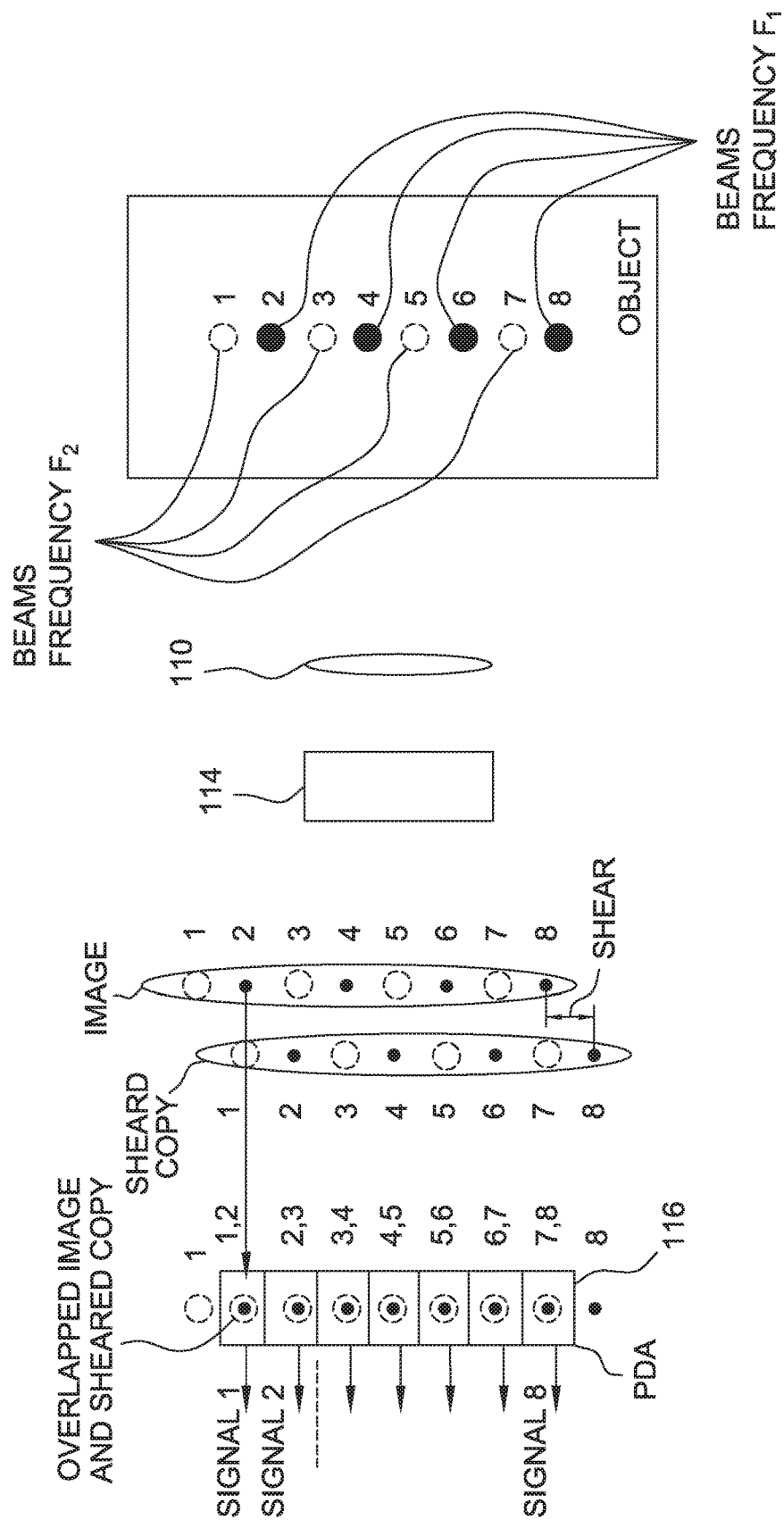
FIG. 5 illustrates spatial mixing of light beams with different frequencies from neighboring laser spots on an object surface.

FIG. 5 illustrates spatial mixing of light beams with different frequencies from neighboring laser spots on object surface 108. Lens 110 combined with a shearing device, for example, interferometer 114, generates an image and its sheared copy sheared in the direction along the line of beams by a spacing between spots in the image. The image and its sheared copy are overlapped on the surface of PDA 116, so that the image of a laser spot with frequency F1 is overlapped with the image of the neighboring spot with frequency F2. For example, image of spot 1 is overlapped with the image of spot 2 on the first element of PDA 116, image of spot 2 is overlapped with the image of spot 3 on the second element of PDA 116, and so on. Overlapped images interfere with each other producing signals with carrier frequency (F2−F1), for example 10 kHz, at the outputs of PDA 116.

Figure 6:
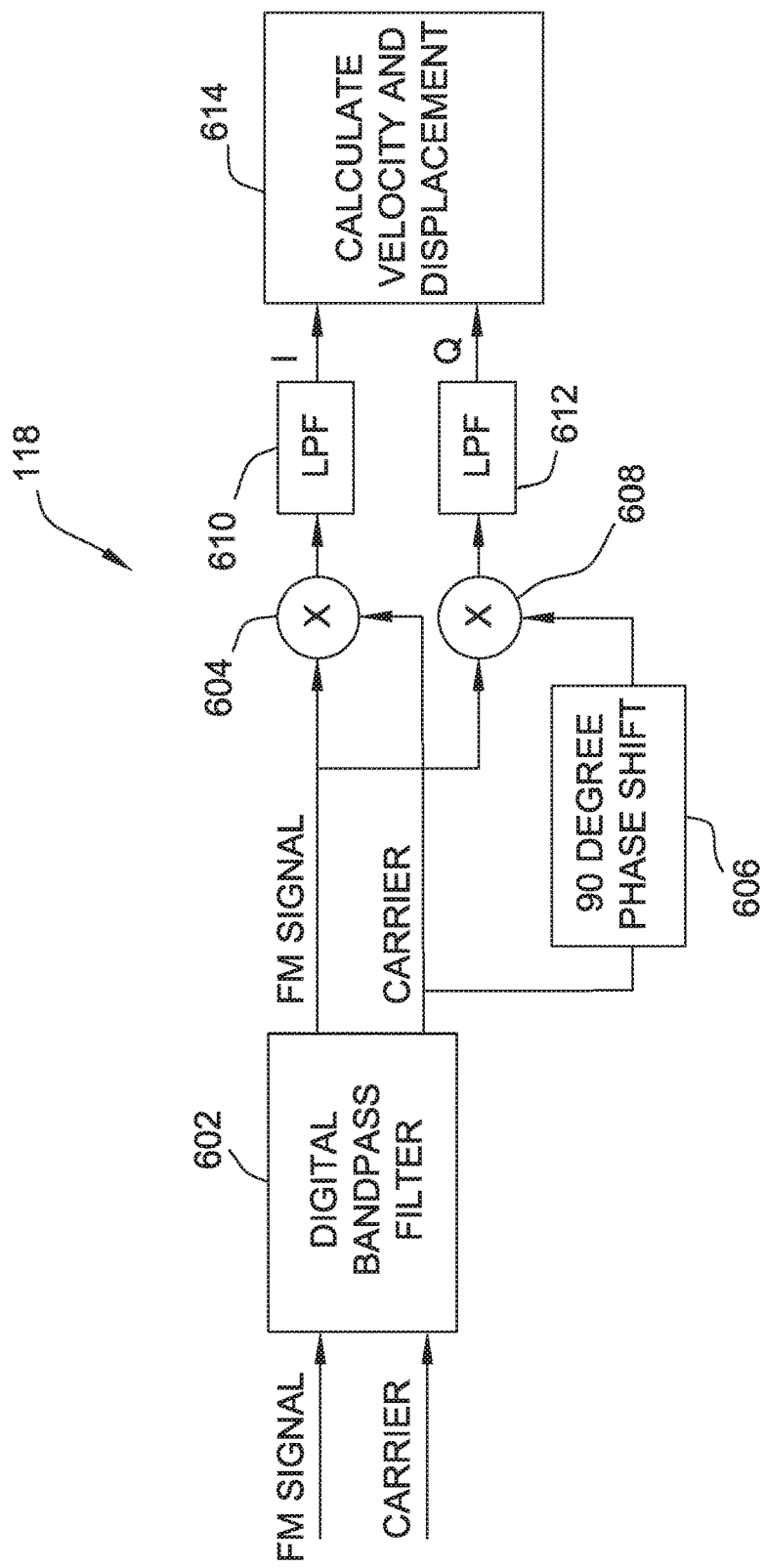
FIG. 6 is a block diagram of one embodiment of a demodulation sub-system that may be used with the system shown in FIG. 1.

FIG. 6 is a block diagram of one embodiment of demodulation sub-system 118. The frequency modulated (FM) signals from PDA 116 and the carrier signal 312 are simultaneously digitized by A/D converter 340 (shown in FIG. 3). As shown, each digitally recorded FM signal and the carrier signal (e.g., the 10 kHz signal) are filtered by a bandpass filter 602 centered at the carrier frequency (e.g., the 10 kHz). Then, the carrier signal and the FM signal are multiplied at a first multiplier 604. Further, the carrier signal is phase shifted using a 90° phase shifter 606 that employs, for example, an algorithm of digital Hilbert transform. The phase shifted carrier signal and the FM signal are multiplied at a second multiplier 608.

The multiplied signals are passed through first and second low pass filters 610 and 612 to generate an in-phase component ("I") and a quadrature component ("Q") for the FM signal. At a calculation block 614, relative vibration velocity and displacement signals, V(t) and X(t), could be calculated from the in-phase and quadrature components. Specifically, in this embodiment, the vibration velocity and displacement signals could be calculated using the following formulas:

$$V(t) = \frac{\lambda}{4\pi}\left[\frac{I(t)Q'(t) - Q(t)I'(t)}{I^2(t) + Q^2(t)}\right]$$

$$X(t) = \frac{\lambda}{4\pi}\tan^{-1}\left[\frac{Q(t)}{I(t)}\right]$$

where λ is the wavelength of the laser light, and I' and Q' are the time derivatives of the in-phase and quadrature components of the signal. Using the vibration velocity or displacement signal between neighboring points, a vibration profile of the object along the line of beams may be generated (e.g., using data output sub-system 120 (shown in FIG. 1)). Relative velocities and displacements between neighboring illuminated points on object surface 108 provides a dynamic deformation gradient of the surface along the line of the beams. The beams may be scanned in the transverse direction by a scanning mirror, or by moving the entire sensor, to provide a 2D deformation gradient of the object across the scanned area. The deformation of the object may be restored by integration of the relative velocities or displacements. Velocity or displacement measured with another sensor at one of the measurement points may also be used to facilitate restoration of deformation of the object.

Figure 7:
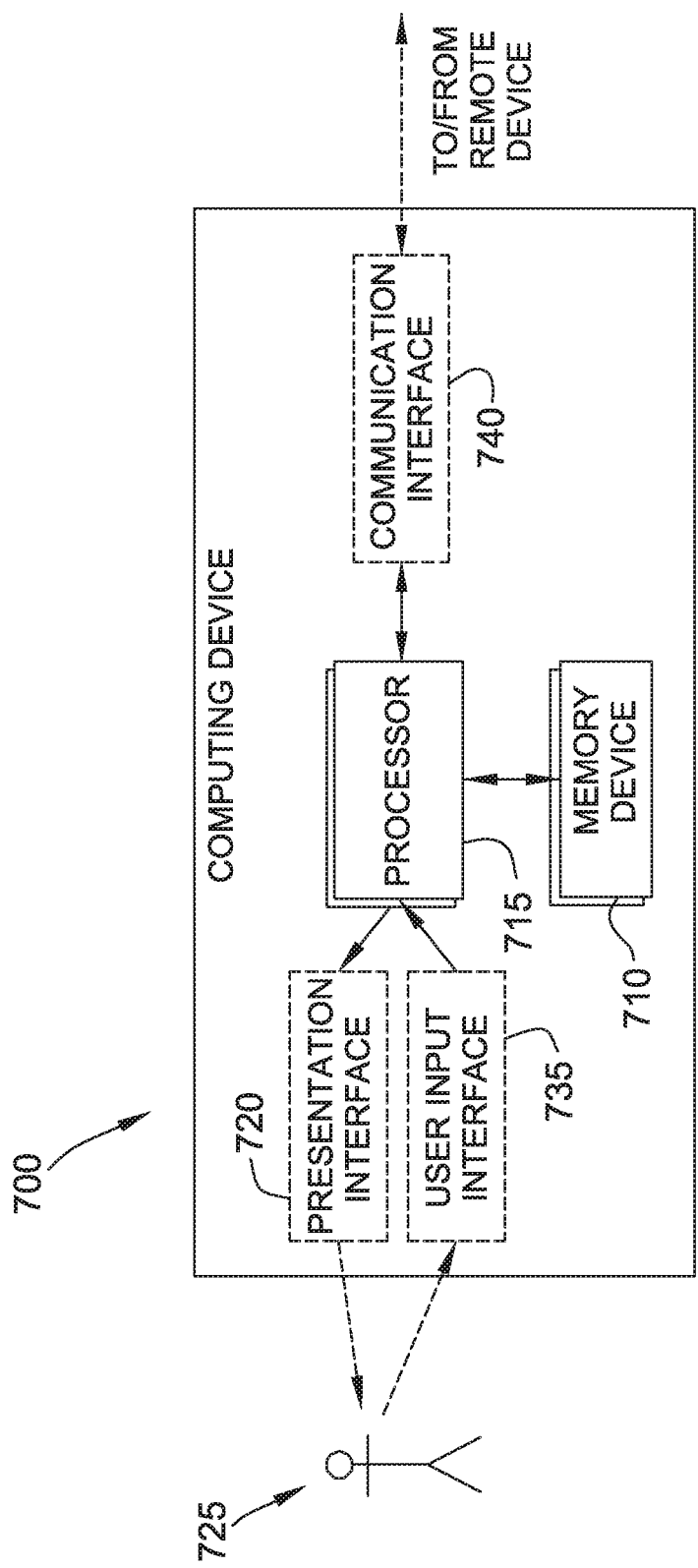
FIG. 7 is a block diagram of one embodiment of a computing device that may be used with the system shown in FIG. 1.

FIG. 7 is a block diagram of one embodiment of a computing device 700 that may be used to implement LaMBDIS sensor 102 (shown in FIG. 1). For example, computing device 700 may facilitate performing at least some of the functions of demodulation sub-system 118 and/or data output sub-system 120 (both shown in FIG. 1).

Computing device 700 includes at least one memory device 710 and a processor 715 that is coupled to memory device 710 for executing instructions. In some embodiments, executable instructions are stored in memory device 710. Computing device 700 performs one or more operations described herein by programming processor 715. For example, processor 715 may be programmed by encoding an operation as one or more executable instructions and by providing the executable instructions in memory device 710.

Processor 715 may include one or more processing units (e.g., in a multi-core configuration). Further, processor 715 may be implemented using one or more heterogeneous processor systems in which a main processor is present with secondary processors on a single chip. As another illustrative example, processor 715 may be a symmetric multi-processor system containing multiple processors of the same type. Further, processor 715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory device 710 is one or more devices that enable information such as executable instructions and/or other data to be stored and retrieved. Memory device 710 may include one or more computer readable media, such as, without limitation, dynamic random access memory (DRAM), static random access memory (SRAM), a solid state disk, and/or a hard disk. The memory device 710 may be configured to store, without limitation, application source code, application object code, source code portions of interest, object code portions of interest, configuration data, execution events and/or any other type of data.

Computing device 700 includes a presentation interface 720 that is coupled to processor 715. Presentation interface 720 presents information to a user 725. For example, presentation interface 720 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 720 includes one or more display devices.

In the embodiment shown in FIG. 7, computing device 700 includes a user input interface 735. In this embodiment, user input interface 735 is coupled to processor 715 and receives input from user 725. User input interface 735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 720 and user input interface 735.

Computing device 700 includes a communication interface 740 coupled to processor 715 in this embodiment. Communication interface 740 communicates with one or more remote devices. To communicate with remote devices, communication interface 740 may include, for example, a wired network adapter, a wireless network adapter, and/or a mobile telecommunications adapter.

Figure 8:
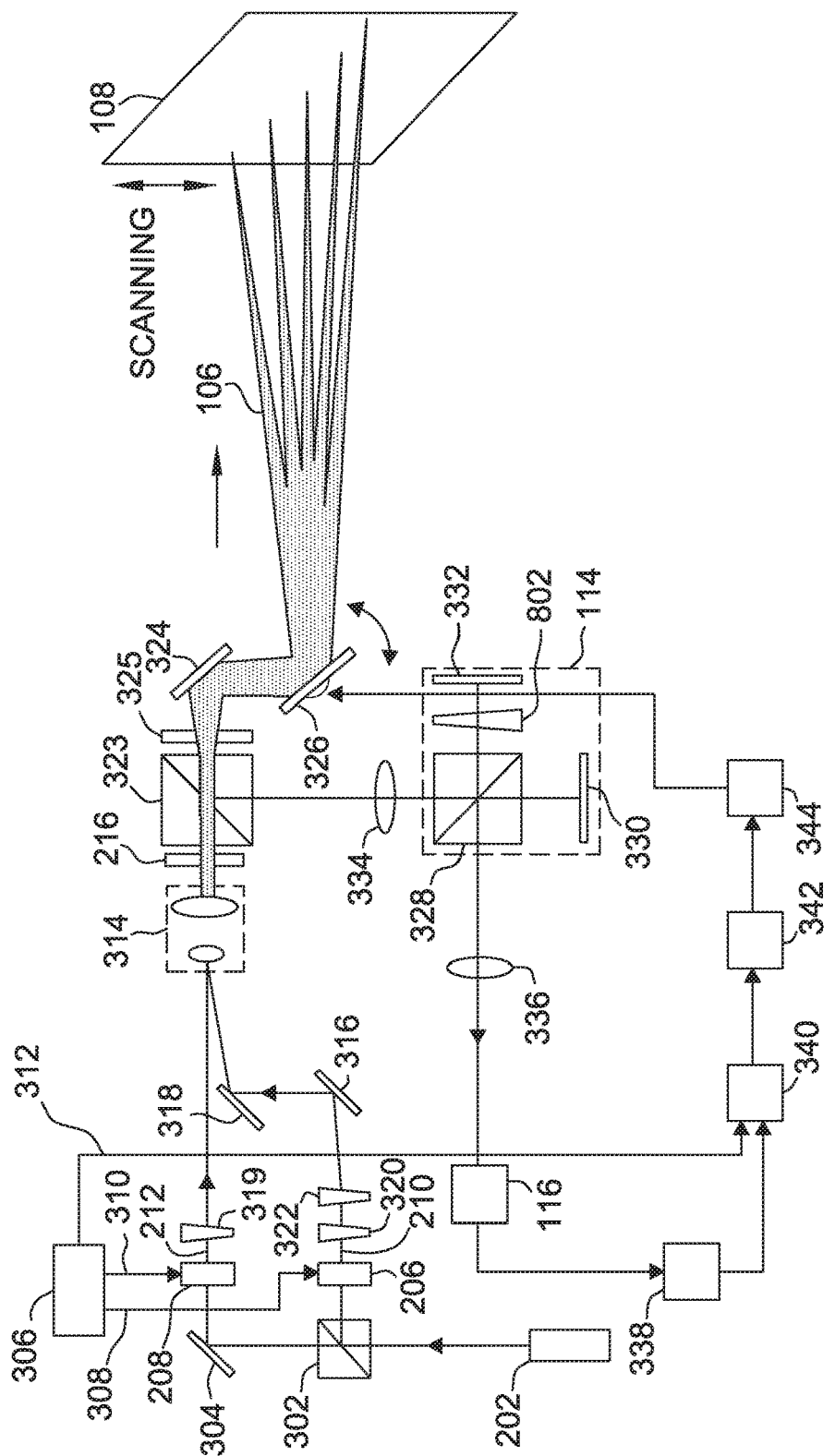
FIG. 8 is an optical schematic diagram of another embodiment of the LaMBDIS shown in FIG. 1.

FIG. 8 shows another embodiment of LaMBDIS sensor 102 (shown in FIG. 1). Unless otherwise indicated, the embodiment shown in FIG. 8 is substantially identical to the embodiment shown in FIG. 3. The embodiment shown in FIG. 8 includes two additional prisms 802 and 804 in interferometer 114. Prisms 802 and 804 are used to facilitate the alignment of interferometer 114. While Mirrors 330 and 332 are used for coarse alignment, prisms 802 and 804 provide precise angular alignment of interferometer 114. The precise angular adjustment of beams in interferometer 114 is implemented by tilting each prism 802 and 804 around an axis parallel to the optical surfaces of the respective prism (changing the angle of incidence of the beam on the prism). Using prisms 802 and 804 for angular adjustment of beams in interferometer 114 improves alignment stability and eases requirements for precise angular adjustments of mirrors 330 and 332.

Figure 9A:
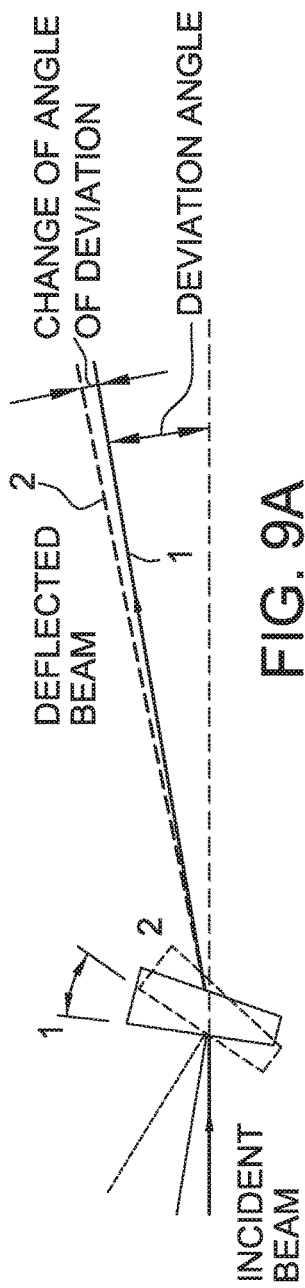
FIGS. 9A and 9B illustrate the principle of angular alignment of a beam by tilting a prism.
Figure 9B:
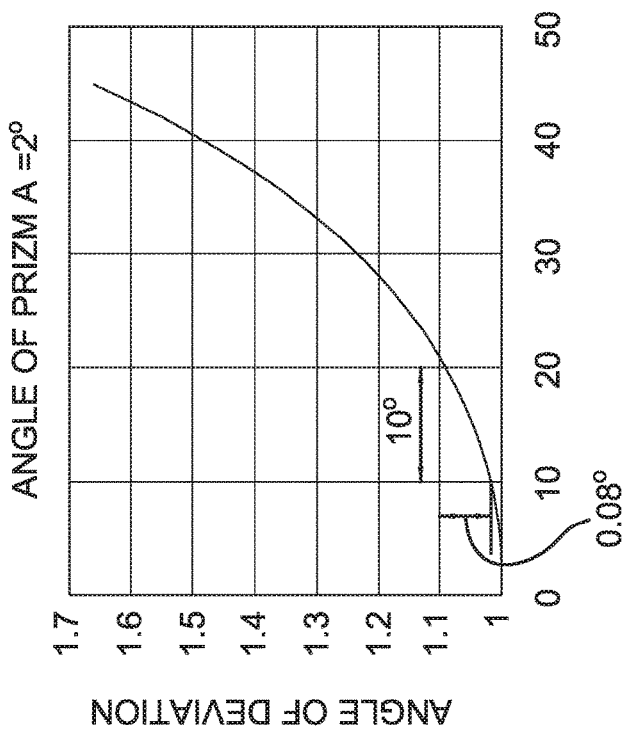

FIGS. 9A and 9B illustrate the principle of angular alignment of a beam by tilting a prism (optical wedge) around the axis parallel to the optical surfaces of the prism (changing the angle of incidence of the beam on the prism). As shown in FIG. 9A an incident beam is deflected by a prism. It is well known that the deviation angle slightly depends on the angle of incidence of the beam. An example of the dependence of the deviation angle on the angle of incidence of the beam on a prism having a 2 degrees angle of prism is shown in FIG. 9B. One can see from FIG. 9B that the change in the angle of incidence by, for example by 10°, causes a small change in the deviation angle (e.g., 0.08°). Accordingly, relatively small angular adjustments of the beam can be achieved with relatively large rotation angles of the prism. For example, angular adjustment of the beam by 4 arc seconds can be achieved by rotating the prism by 0.13°. The sensitivity of the angular adjustment can be selected by selecting a prism angle and the initial angle of incidence. Notably, this method of alignment does not require a high precision mechanical device, and it is also considerably less sensitive to the mechanical instabilities, as compared to adjustment using a mirror with precise angular adjustments, that could improve alignment stability with time.

Figure 10A:
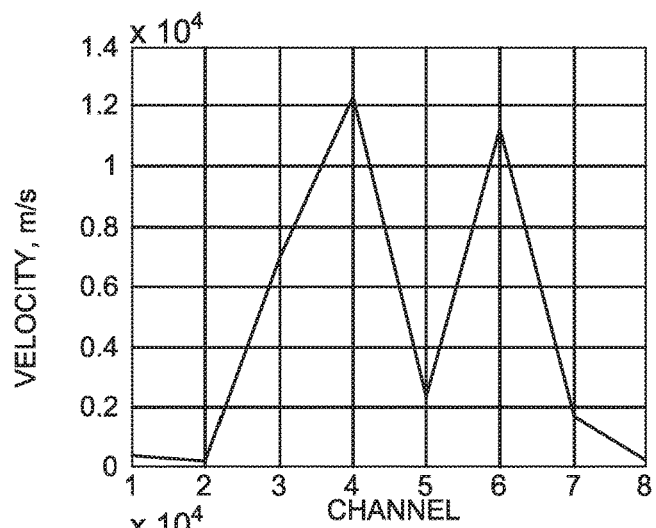
FIGS. 10A-10C show measurement results of spatial relative vibration velocity profiles.
Figure 10B:
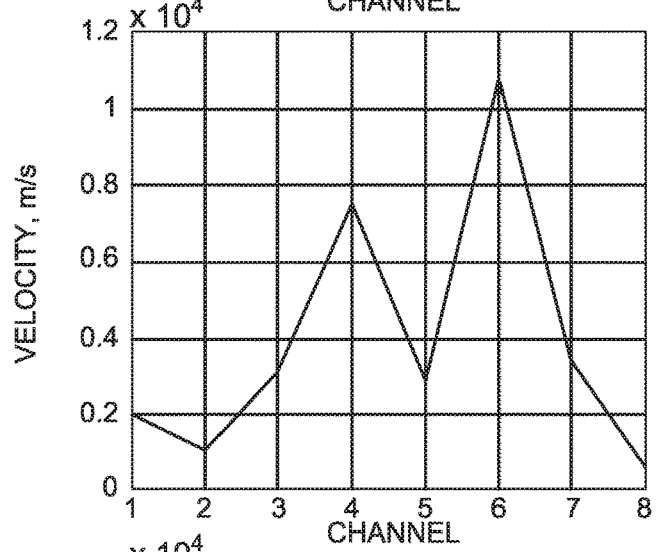
Figure 10C:
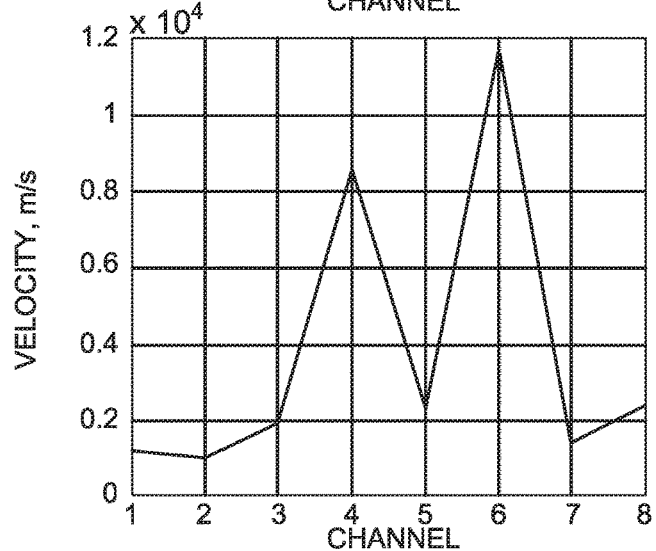

Using a LaMBDIS sensor, such as LaMBDIS sensor 102 (shown in FIG. 1), to measure a spatial velocity profile of a vibrating moving object has been experimentally verified using an eight channel LaMBDIS sensor. For example, FIGS. 10A-10C show the measurement results of spatial relative vibration velocity profiles of a circumferentially clamped circular plate vibrating at 159 Hz at a stationary position (FIG. 10A), and moving along the beams at a speed of 0.57 m/s (FIG. 10B) and 1.33 m/s (FIG. 10C) obtained with a LaMBDIS sensor. The relative velocity profiles of a moving object, shown in FIGS. 10B and 10C are in a good agreement with the relative velocity profile of the stationary object shown in FIG. 10A. Some differences in the profiles are due to the fact that positions of laser beams on the target object change during the motion.

Figure 11:
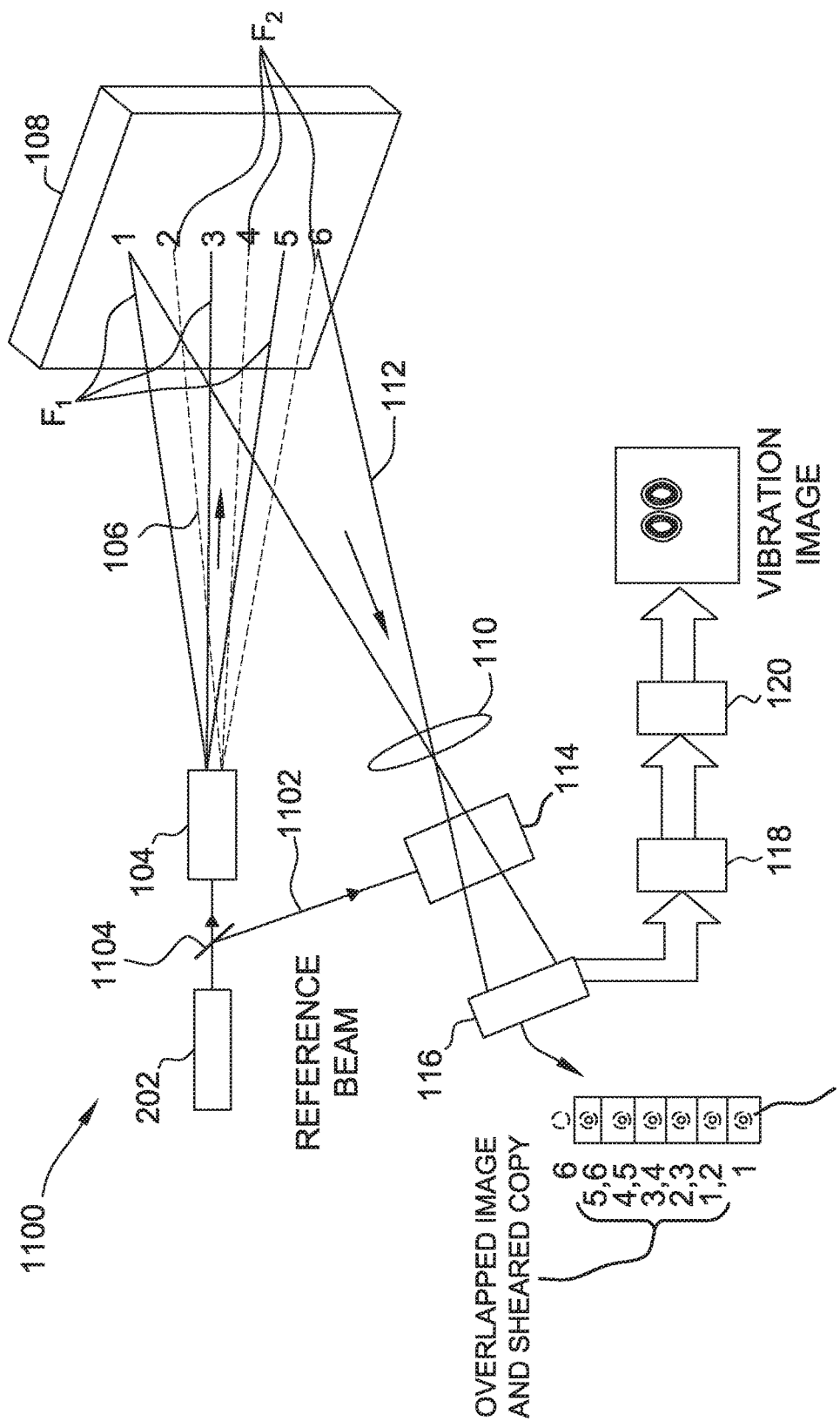
FIG. 11 is a schematic diagram of an alternative vibration imaging system.

FIG. 11 is a functional layout of an alternative system 1100 for vibration imaging. In system 1100, in contrast to system 100 (shown in FIG. 1), a reference beam 1102 is generated in a beam splitter 1104 and is overlapped with an image of one of the edge spots (object beams) which is not mixed with a spot from a sheared copy of the image (e.g., spot "1") on the PDA 116. The overlapped reference and object-reflected beams produce an interference signal that allows measurement of velocity/displacement of the object at the point of incidence of that object beam. The velocity/displacement measured at that point on the object combined with the relative velocities/displacements measured between pairs of points on the object with the LaMBDIS described above facilitates obtaining a deformation profile for the object.

Figure 12:
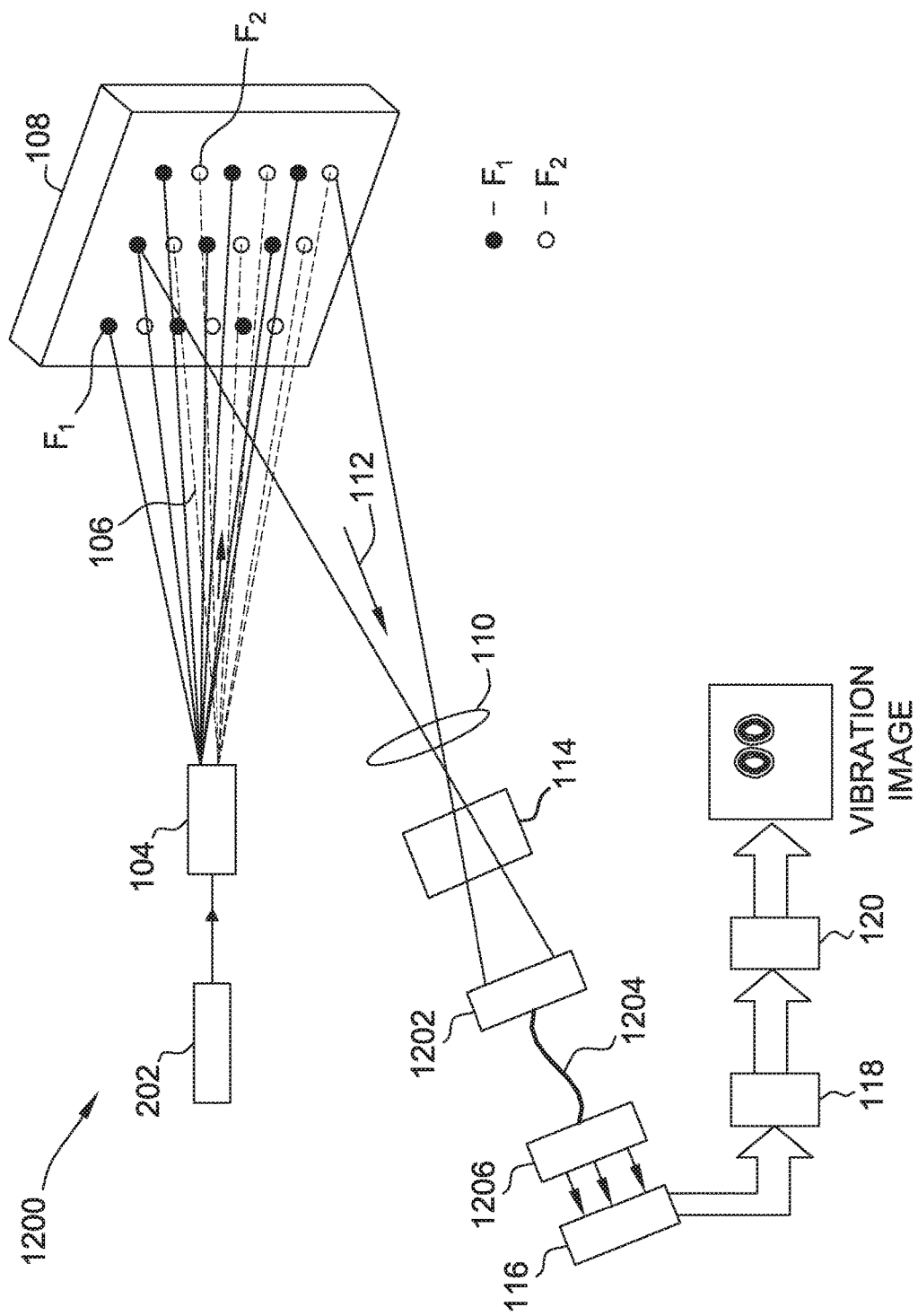
FIG. 12 is a schematic diagram of another alternative vibration imaging system.

FIG. 12 is a schematic diagram of another alternative vibration imaging system 1200. System 1200 allows for simultaneous measurement of vibration and dynamic deformation of an object in a two-dimensional ("2D") array of points using a linear array photodetector. Linear array photodetectors, for example line scan cameras, could have a considerably higher line rate than the frame rate of 2D array photodetectors, such as area scan cameras. Accordingly, using a linear array photodetector for measuring vibration, deformation, and other fast processes in a 2D array of points on the object could be beneficial.

System 1200 includes a laser 202, a transmitter 104, a lens 110, a shearing device 114, a 2D fiber-coupled micro-lens array 1202, a fiber bundle 1204, a linear fiber-coupled micro-lens array 1206, a linear array photodetector 116, a demodulation sub-system 118 and a data output sub-system 120, that may, for example, generate a vibration velocity or displacement image or profile from the demodulated signals and display the vibration velocity or displacement image or profile to a user. The sensor operates based on interference of light reflected from neighboring points on object surface 108 illuminated with a 2D array of laser beams. For example, a 2D array of 32×32 beams may be focused on object surface 108 (a 3×6 array is shown for simplicity). The light reflected from each point of object surface 108 is collected with the lens 110. In the interferometer 114, the light from each pair of neighboring laser spots on object surface 108 is mixed together for interference on 2D fiber-coupled micro-lens array 1202.

The interfering optical lights are coupled into fiber bundle 1204 and transmitted to linear fiber-coupled micro-lens array 1206. The combination of the 2D fiber-coupled micro-lens array 1202, fiber bundle 1204, and the linear fiber-coupled micro-lens array 1206 transforms an image of the 2D array of laser spots into a linear array of laser beams. This linear array of beams is converted into electrical signals by linear array photodetector 116 (e.g., a line scan camera). In other embodiments, transformation of an image of the 2D array of spots into a linear array of beams may be accomplished using different optical devices. The linear array photodetector signals are simultaneously digitized and digitally demodulated to produce a spatial distribution of vibration velocity or displacement across the object surface illuminated by 2D array of laser beams. A device that transforms an image of the 2D array of spots into a linear array of beams, such as the above-described combination of 2D fiber-coupled micro-lens array 1202, fiber bundle 1204, and linear fiber-coupled micro-lens array 1206, may also be used in at least some known multi-beam laser vibrometers that employ reference beams.

Figure 13:
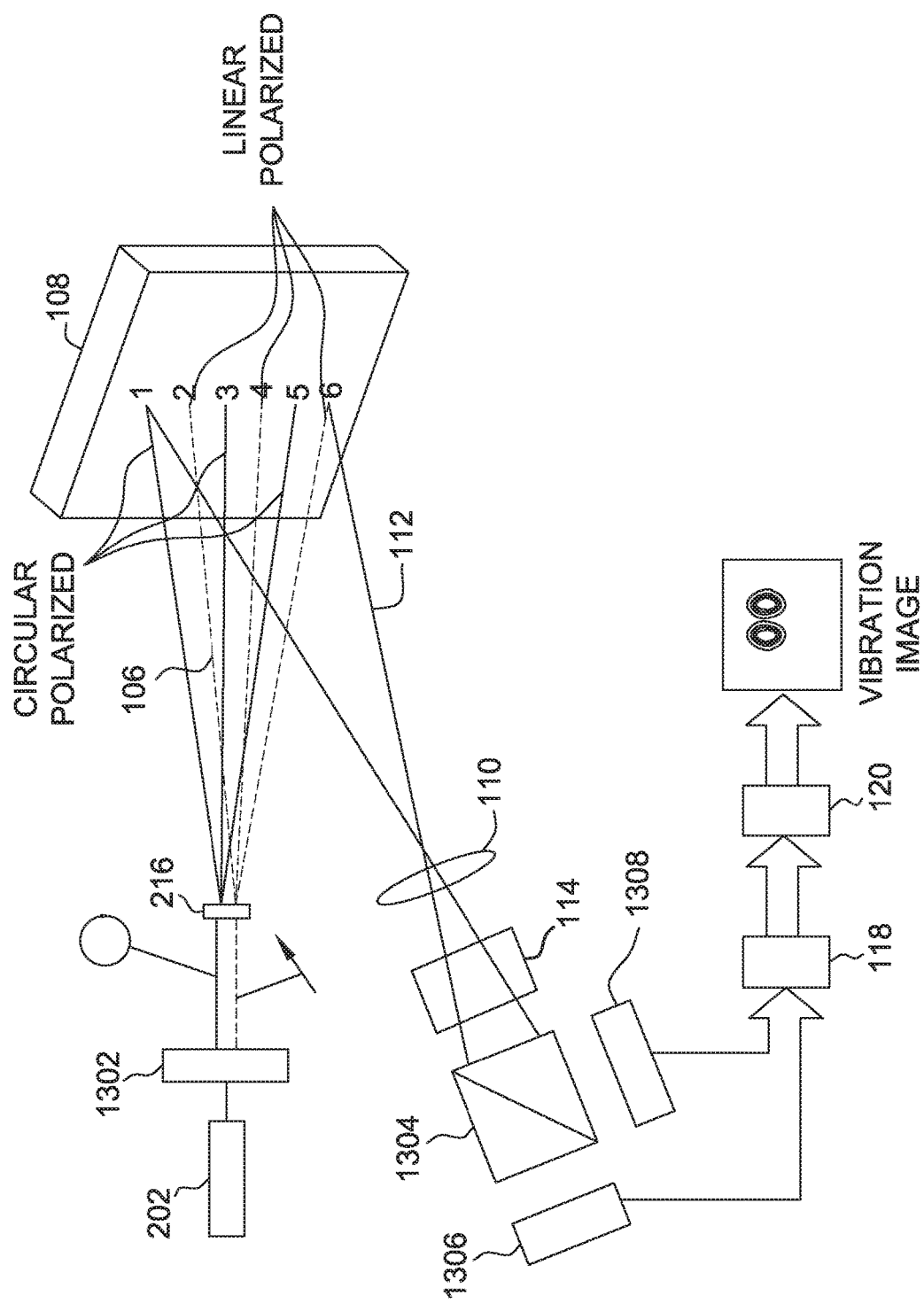
FIG. 13 is a schematic diagram of another alternative vibration imaging system.

FIG. 13 is a functional layout of another embodiment that employs two PDAs to perform vibration measurements using a homodyne in-phase and quadrature (I&Q) detection technique. In the embodiment of FIG. 13, a beam from laser 202 is divided into two beams that have different polarization states or polarization directions by a beam splitter 1302. For example, one of the beams could be circular polarized, and the other beam could be linear polarized. Alternatively, two beams could have linear orthogonal polarizations. DOE 216 forms an array of beams on object surface 108, so that neighboring beams have different polarizations. For example, each circular polarized beam is positioned exactly between two linear polarized beams. Alternatively, neighboring beams could have orthogonal linear polarizations. Components 216, 110, and 114 perform the same functions as in the embodiment shown in FIG. 2. A polarized beam splitter 1304 produces I & Q interference signals on two PDAs 1306 and 1308. The PDA signals are digitized and demodulated using digital demodulation (e.g., using demodulation sub-system 118). The relative velocity and displacement is derived from the relative phases of the signals of PDAs 1306 and 1308.

Figure 14:
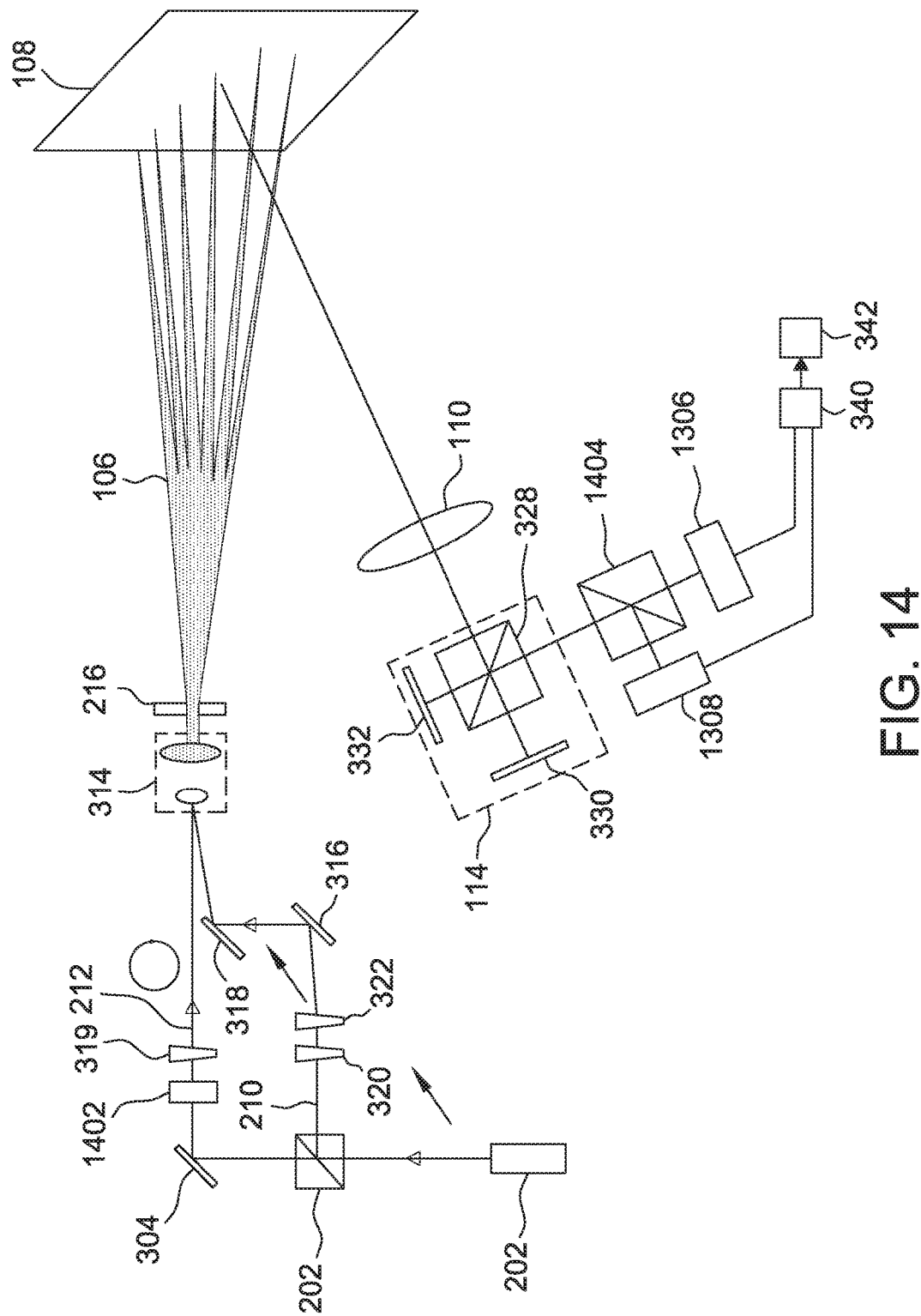
FIG. 14 is a schematic diagram of another alternative vibration imaging system.

FIG. 14 shows an optical schematic of another embodiment that uses circular and linear polarized beams in the beams array on object surface 108 and two PDAs 1306 and 1308 to perform vibration measurements using a homodyne I&Q detection technique. A linearly polarized beam from laser source 202 is split into two equal intensity beams by beam splitter 302. Mirror 304 directs the beam transmitted by beam splitter 302 parallel to the beam reflected by beam splitter 302. A quarter wave plate (QWP) 1402 changes the polarization of beam 212 from linear to circular. Components 314, 316, 318, 319, 320, 322, and 216 operate substantially the same as in the embodiment shown in FIG. 3. As a result, DOE 216 forms an array of beams on object surface 108, so that neighboring beams have different polarizations. For example, each circular polarized beam is positioned exactly between two linear polarized beams. Lens 110 and shearing device (interferometer) 114 create an image and its sheared copy on PDAs 1306 and 1308 in the same way as in the embodiment shown in FIG. 3. A polarizing beam splitter 1404 creates I and Q interference signals on PDAs 1306 and 1308 respectively. The signals from PDAs 1306 and 1308 are digitized using A/D converter 340, and demodulated using digital demodulation (e.g., using demodulation sub-system 118 (shown in FIG. 1)) in the computer 342. The relative velocity and displacement can be derived from the I and Q signals of PDAs 1306 and 1308 in a way similar to that used in the heterodyne signals processing described in the embodiments shown in FIGS. 2 and 3.

The laser multibeam differential interferometric vibrations sensors described herein may be utilized in multiple applications. For example, laser multibeam differential interferometric vibrations sensors described herein may be used in quality control applications. For instance, a LaMBDIS sensor may be used for non-destructive testing of an object, such as a composite panel, to detect delaminations and other defects in the object. The non-destructive testing may be performed on a wide variety of materials and structures. The vibration imaging systems described herein may also be used for vibration testing of mechanical structures, modal analysis, structural health monitoring, and dynamic strain and stress analysis. The vibration imaging systems described herein may also be used in military applications (e.g., detecting buried mines), biology applications (e.g., detecting vibrations of insects), medical applications (e.g., ear drum diagnosis, detecting vibration of heart valve tendons, and detecting photoacoustic signals), biomedical applications (e.g., physiology and biometrics, biomechanics), respiration, acoustics (e.g., instruments and speakers, transducer characterization, noise source identification), wind tunnel testing, and/or materials research.

A technical effect of the systems and methods described herein includes at least one of: (a) projecting an array of laser beams onto a surface of an object such that neighboring beams in the array of laser beams are frequency shifted relative to each other, or have different polarization states or polarization directions; (b) mixing the radiations reflected from neighboring illuminated points on the object together such that the radiations from neighboring beams interfere with one another; (c) producing electric signals representative of the interference signals; (d) demodulating the electric signals; and (e) calculating relative velocities and displacements of the object and a deformation profile for the object based on the demodulated signals.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A sensor for a vibration imaging system, the sensor comprising:
   a transmitter configured to project an array of laser beams onto a surface of an object such that neighboring beams in the array of laser beams are frequency shifted relative to each other;
   an interferometer configured to mix radiations reflected from neighboring points on the surface of the object such that the radiations from neighboring points interfere with one another, wherein the interferometer is configured to mix only radiations from beams that are reflected from the surface of the object;
a photodetector array configured to produce output signals representative of the interfering beams;
a demodulator configured to demodulate the output signals; and
a computing device comprising a processor communicatively coupled to a memory device, the computing device configured to calculate a deformation profile for the object based on the demodulated output signals.

2. A sensor according to claim 1, wherein the transmitter is configured to project a linear array of laser beams.

3. A sensor according to claim 1, wherein the transmitter is configured to project a two-dimensional array of laser beams.

4. A sensor according to claim 1, wherein the computing device is configured to calculate a deformation profile to facilitate detecting delamination in the object.

5. A sensor according to claim 1, wherein the transmitter is configured to project an array of laser beams onto a surface of an object that is moving relative to the sensor.

6. A sensor according to claim 1, wherein the transmitter comprises at least one acousto-optical modulator configured to shift the frequency of the laser beams.

7. A vibration imaging system for performing non-destructive testing on an object, the system comprising:
an object having a surface; and
a sensor configured to generate a deformation profile for the object, the sensor comprising:
a transmitter configured to project an array of laser beams onto the surface such that neighboring beams in the array of laser beams are frequency shifted relative to each other;
an interferometer configured to mix radiations reflected from neighboring points on the object surface together such that the radiations from neighboring points interfere with one another, wherein the interferometer is configured to mix only radiations from beams that are reflected from the surface of the object;
a photodetector array configured to produce output signals representative of the interfering beams;
a demodulator configured to demodulate the output signals; and
a computing device comprising a processor communicatively coupled to a memory device, the computing device configured to calculate the deformation profile based on the demodulated output signals.

8. A system according to claim 7, wherein the transmitter is configured to project a linear array of laser beams.

9. A system according to claim 7, wherein the transmitter is configured to project a two-dimensional array of laser beams.

10. A system according to claim 7, wherein the computing device is configured to calculate a deformation profile to facilitate detecting delamination in the object.

11. A system according to claim 7, wherein the transmitter is configured to project an array of laser beams onto a surface of an object that is moving relative to the sensor.

12. A system according to claim 7, wherein the photodetector array includes a linear array photodetector.

13. A system according to claim 12, wherein the photodetector array further comprises a two-dimensional fiber-coupled micro-lens array optically coupled to a first end of a fiber bundle, and a linear fiber-coupled micro-lens array optically coupled to a second end of the fiber bundle, and wherein the combination of the two-dimensional fiber-coupled micro-lens array, the fiber bundle, and the linear fiber-coupled micro-lens array transform a two-dimensional array of beams into a linear array of beams to be received by the linear array photodetector.

14. A system according to claim 7, wherein the interferometer comprises at least one prism for performing angular adjustment of radiation beams within the interferometer.

15. A method for generating a deformation profile for an object for non-destructive testing purposes, the method comprising:
projecting an array of laser beams onto a surface of the object such that neighboring beams in the array of laser beams are frequency shifted relative to each other;
mixing, using an interferometer, radiations reflected from neighboring points on the object surface together such that the radiations from neighboring points interfere with one another, wherein the interferometer mixes only radiations from beams that are reflected from the surface of the object;
producing, using a photodetector array, output signals representative of the interfering beams;
demodulating the output signals; and
calculating the deformation profile based on the demodulated output signals.

16. A method according to claim 15, wherein projecting an array of laser beams comprises projecting a linear array of laser beams.

17. A method according to claim 15, wherein projecting an array of laser beams comprises projecting a two-dimensional array of laser beams.

18. A method according to claim 15, further comprising detecting whether delamination is present in the object based on the deformation profile.

19. A method according to claim 15, wherein projecting an array of laser beams comprises projecting an array of laser beams onto a surface of an object that is moving relative to the sensor.

20. A method according to claim 15, further comprising performing angular adjustment of radiation beams within the interferometer using at least one prism.

21. A sensor for a vibration imaging system used to perform non-destructive testing on an object, the sensor comprising:
a transmitter configured to project an array of laser beams onto a surface of the object such that neighboring beams in the array of laser beams have different polarizations;
an interferometer configured to mix radiations reflected from neighboring points on the surface of the object such that the radiations from neighboring points interfere with one another, wherein the interferometer is configured to mix only radiations from beams that are reflected from the surface of the object;
two photodetector arrays configured to produce output signals representative of the interfering beams using a homodyne in-phase and quadrature detection technique;
a demodulator configured to demodulate the output signals; and
a computing device comprising a processor communicatively coupled to a memory device, the computing device configured to calculate a deformation profile for the object based on the demodulated output signals.

22. A method for generating a deformation profile for an object for non-destructive testing purposes, the method comprising:

projecting an array of laser beams onto a surface of the object such that neighboring beams in the array of laser beams are frequency shifted relative to each other;

mixing, using an interferometer, radiations reflected from neighboring points on the object surface together such that the radiations from neighboring points interfere with one another;

producing, using a photodetector array, output signals representative of the interfering beams;

demodulating the output signals; and calculating the deformation profile based on the demodulated output signals, wherein the deformation profile is also calculated based on overlapping a single reference beam with a single beam reflected from the object surface.

* * * * *

UNITED STATES PATENT AND TRADEMARK OFFICE
CERTIFICATE OF CORRECTION

PATENT NO. : 10,429,171 B2
APPLICATION NO. : 15/745771
DATED : October 1, 2019
INVENTOR(S) : Vyacheslav Aranchuk It is certified that error appears in the above-identified patent and that said Letters Patent is hereby corrected as shown below:

On the Title Page

Item (72) inventor, delete "Aranchuk Vyacheslav" and insert therefor -- Vyacheslav Aranchuk --.

Signed and Sealed this
Fourth Day of August, 2020

Andrei Iancu
*Director of the United States Patent and Trademark Office*